Figure 1:
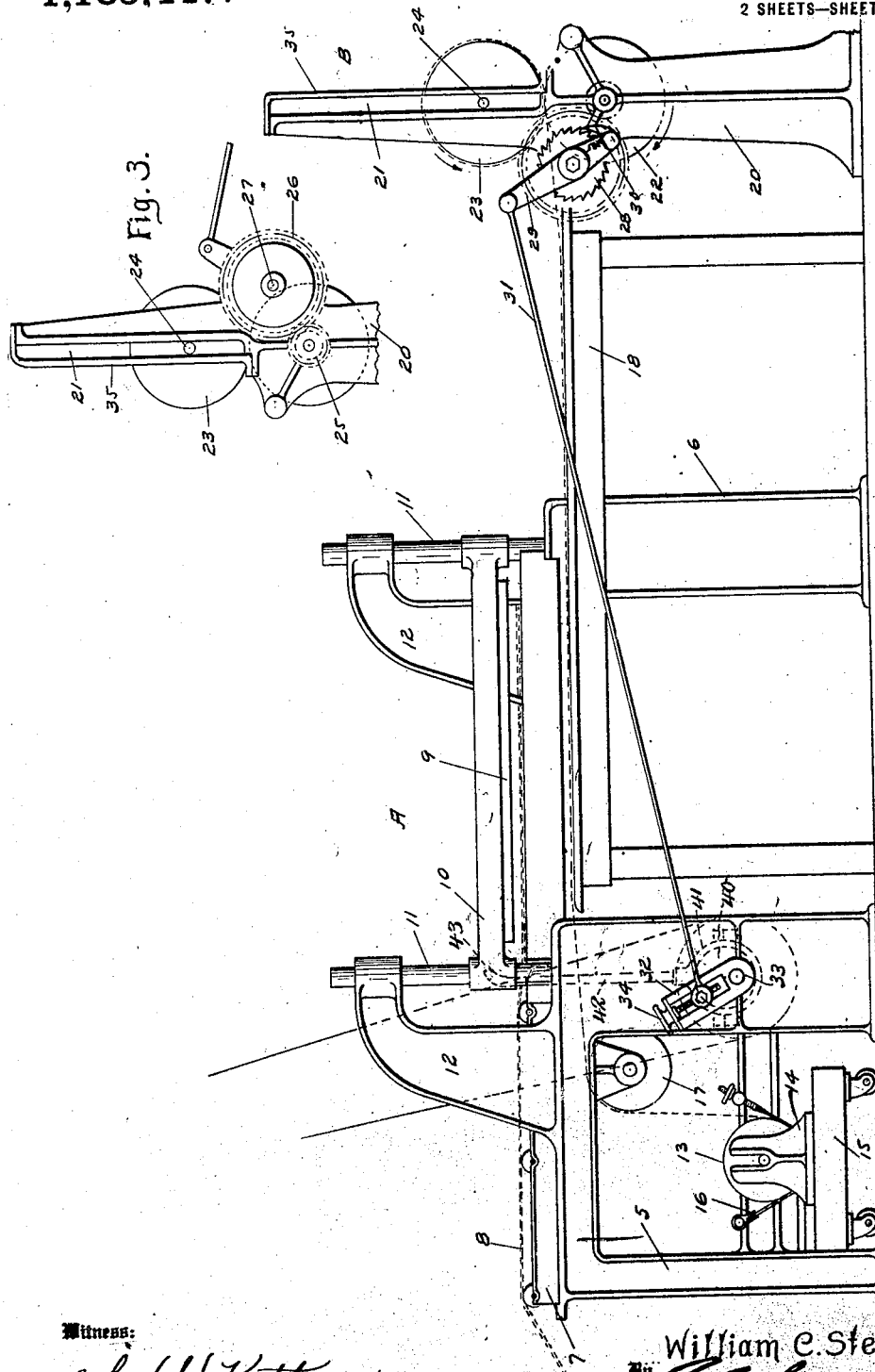

W. C. STEVENS.
BIAS CUTTER TAKE-UP.
APPLICATION FILED JUNE 18, 1915.
1,185,447.
Patented May 30, 1916.
2 SHEETS—SHEET 2.
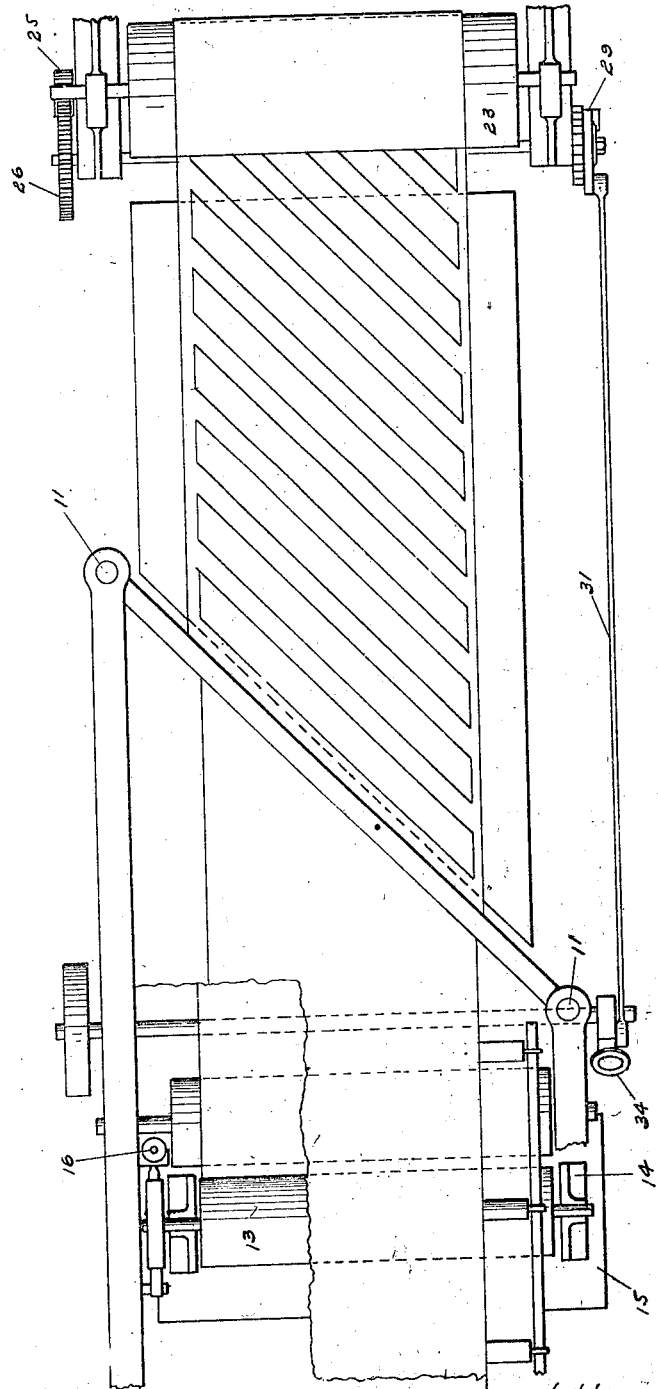
Fig. 2.
Witness:
John W. Kittredge
Lewis J. Geist
Inventor
William C. Stevens.
By 
Attorney

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

BIAS-CUTTER TAKE-UP.

1,185,447.     Specification of Letters Patent.     Patented May 30, 1916.

Application filed June 18, 1915. Serial No. 34,802.

*To all whom it may concern:*

Be it known that I, WILLIAM C. STEVENS, a citizen of the United States, residing at Akron, in the county of Summit and State of Ohio, have invented certain new and useful Improvements in Bias-Cutter Take-Ups, of which the following is a specification.

This invention relates to a machine for handling fabric, which has been provided with a coat of gum, commonly known as "frictioned fabric," designed to be used in the manufacture of pneumatic tire carcasses, after it has been cut into strips of desired width on the bias.

In the drawing the invention is shown combined with the ordinary bias cutter, which latter is shown only in outline, the details thereof, forming no part of the present invention.

Figure 1 is a side elevation. Fig. 2 is a plan. Fig. 3 is a view of the rear end of the table from the side opposite Fig. 1.

In making the ordinary pneumatic tire carcass, it is the practice to coat or friction the fabric on one side with a layer of gum. The fabric is then wound onto reels with an interposed layer of muslin to prevent adhesion, and taken to a cutting machine which cuts it into strips of predetermined width at an angle of 45°. In the operation of the bias cutting heretofore, the fabric has been led under a vertically reciprocating knife, which cuts off the strips in the desired width. The severed strips fall upon a series of longitudinal parallel belts running continuously. At the end of the belts the strips of fabric have been taken off by two operators, one on each side of the machine, and placed in books. A so-called "book" consists of a board with a number of strips of muslin secured thereto along one longitudinal edge by a narrow nailing strip. The operation of placing the bias strips in books is expensive and tedious, as it requires the employment of two operators at the delivery end of the machine, picking the bias fabric off the belts, and turning over the leaves of the books before placing a new strip therein.

It has been the purpose of this invention to replace this method of handling the bias fabric, by providing a traveling liner upon which the strips fall, and which is wound up with them in a compact roll, which is more easily and less expensively handled, than the books. By this apparatus the cutting and packaging of the bias strips may be more rapidly done than by the old method.

In Fig. 1 A represents generally the bias cutter and B the take-up. The bias cutter is shown in outline only, and consists of standards 5 and 6, which support a table 7, over which the frictioned fabric 8 is guided. The rear end of the table is cut off at an angle of 45°, and coöperating with the edge, is a reciprocating knife 9, carried by a cross-head 10, sliding on pillars 11, which are held by the standards at their lower ends, and by brackets on the standards at their upper ends. The knife is moved up and down by a mechanism not shown, and the fabric drawn forward over the table and under the knife by reciprocating grippers, which are also not shown, as they are the equipment of an ordinary bias cutter.

To receive the bias strips after they fall from the cutter, there is mounted a reel of muslin or other liner 13, in standards 14 on a wheel truck 15, which may be pushed under the frame below the table 8. An adjustable brake band 16 is provided on the frame, to exert frictional contact on the reel, in order to prevent over-running. The truck 15 may be rolled out, and a new liner roll placed thereon, when the old one is exhausted.

From the reel 13, the liner passes up over an idle roller 17, suspended from the under side of the framework, and then under the cutter and over a table 18, the roller and table guiding the liner under the cutter. This table is long enough to allow several strips of the bias fabric to be in a position to be inspected or measured, prior to being wound up. Several strips are shown passing from the cutter to the winding-up mechanism in Fig. 2.

As designated at B, the winding-up or packaging mechanism consists of uprights or supports 20, which are located at the rear of the table, and are provided at their upper extremities with vertical or substantially vertical slots or guides, 21. Directly below the guides, is rotatably mounted a drum 22, the surface of which is covered with sand paper or otherwise roughened. On the upper surface of the drum is placed a reel or take-up roll 23, a spindle 24, of which is guided in the slot 21. As shown, the liner with the bias strips superimposed thereon, passes between the rolls 22 and 23, and as they are moved in the direction of the arrows, it will be wound up on the reel 23.

To rotate the reel, the drum 22 is provided with a pinion 25, which meshes with a gear 26 on a transverse shaft 27, supported in the standards. A ratchet wheel 28 is secured to the shaft 27, on the end of which is loosely mounted an arm 29, carrying a pawl 30. Rocking movement is imparted to the pawl carrying arm by a link 31, which is actuated by a crank arm 32, secured to a continuously rotating shaft 33. As shown, the shaft 33 is preferably the one which imparts the reciprocating movement to the knife, and the connections are such that the drum is rotated and the muslin advanced while the knife is moving upwardly. The construction to perform this operation is shown in Fig. 1, and consists of an eccentric 40 secured to the shaft 33 and operating the strap 41, from which is extended a link 42 pivotally connected at 43 to cross head 10. The throw of the link 31 is adjusted by means of the familiar radial screw 34, in order to vary the amount of advance of the muslin to accommodate strips of different widths without excess spacing.

The operation of this apparatus can be readily understood.

The bias strips as they are cut off from the leading end of the frictioned fabric, fall onto the liner strip, and are carried by it to the rear of the machine, where they are rolled up with the liner. In this manner, the separate strips are kept from contact with each other, and the machine performs automatically the operation of the work formerly required of two operators. When a roll is filled, it may be removed by taking away the rear side 35 of the guide which is made separate for this purpose, and a new one substituted.

The roll or package of bias strips with the interposed liner which is made by this machine, forms the subject matter of a copending application, Serial No. 34,803, filed herewith.

It is obvious that various changes and modifications might be made in the form of apparatus shown herein, without departing from the spirit of the invention as set forth in the appended claims.

Claims:

1. The combination with a machine for cutting a material into strips, of a liner supply, means for guiding the liner under the cutter, and means for packaging the liner and the strips.

2. The combination with a machine for cutting fabric into strips of a liner supply, means for guiding the liner under the cutter, and means for winding up the liner with the strips.

3. The combination with a machine for cutting fabric on the bias, a liner supply, means for guiding the liner under the cutter and means for drawing the liner under the cutter and winding it up with the bias strips.

4. The combination with a bias cutter of a liner supply and means for drawing the liner from the supply under the cutter and winding it up with the bias strips.

5. The combination with a bias cutter, a liner supply, means for intermittently drawing the liner from the supply under the cutter and winding it up with the bias strips, the cutter and the means for drawing and winding the liner operating alternately.

WILLIAM C. STEVENS.

Witness:
J. J. SHEA.